United States Patent [19]

Edlund et al.

[11] Patent Number: 4,654,813
[45] Date of Patent: Mar. 31, 1987

[54] ELECTRONIC SQUARE ROOT ERROR INDICATOR

[75] Inventors: Carl E. Edlund, Castroville; Cecil R. Sparks, San Antonio, both of Tex.

[73] Assignee: Southern Gas Association, Dallas, Tex.

[21] Appl. No.: 588,113

[22] Filed: Mar. 9, 1984

[51] Int. Cl.[4] .............................................. G06F 7/38
[52] U.S. Cl. .................................... 364/571; 73/861.43; 73/861.48; 364/510; 364/752
[58] Field of Search .............. 364/510, 558, 571, 752; 73/861, 861.02, 861.03, 195, 196, 861.42, 861.43, 861.44, 861.48

[56] References Cited

U.S. PATENT DOCUMENTS

| | | | |
|---|---|---|---|
| 3,278,728 | 10/1966 | Ralsdale | 364/558 |
| 3,444,736 | 5/1969 | Stedman | 73/861.48 |
| 4,250,553 | 2/1981 | Sebens et al. | 364/558 |
| 4,277,832 | 7/1981 | Wong | 364/510 |
| 4,388,691 | 6/1983 | Nuspl | 73/861.48 |
| 4,409,660 | 10/1983 | Shauler | 364/510 |
| 4,414,634 | 11/1983 | Louis et al. | 364/510 |
| 4,450,715 | 5/1984 | Sumal | 364/571 |

OTHER PUBLICATIONS

Stough, "Automatic Temperature and Pressure Compensation"; Instr. & Control Systems; Aug. 1959; pp. 1180–1181.

Beitler et al.; "Developments in the Measuring of Pulsating Flows with Inferential-Head Meters"; translations of A.S.M.E.; May 1943.

Primary Examiner—Errol A. Krass
Attorney, Agent, or Firm—Hubbard, Thurman, Turner & Tucker

[57] ABSTRACT

An apparatus for determining a square root averaging error for a differential pressure orifice meter while measuring volumetric fluid flow in a closed medium including input circuitry that provides an input signal corresponding to the instantaneous differential pressure measured at the orifice plate and logic circuitry connected to receive the signals from the input circuitry for computing the square root averaging error for the orifice meter over a selected time interval. Also disclosed is an apparatus for measuring volumetric fluid flow in a closed medium that includes input circuitry for providing an input signal corresponding to a differential pressure at an orifice located within the closed medium and logic circuitry connected to receive the input signal, compute a square root of the corresponding differential pressure and provide an output signal corresponding to this square root.

9 Claims, 5 Drawing Figures

ELECTRONIC SQUARE ROOT ERROR INDICATOR

BACKGROUND

1. Field of the Invention

This invention relates to the measurement of volumetric fluid flow in a closed medium and more specifically to the measurement of volumetric fluid flow when the flow is unsteady or pulsating.

2. Description of Prior Art

Many industries, such as natural gas and oil industries, rely on pipelines to transport their products from location to location. During this transfer, the measurement of the oil or gas transferred is required. In the past, these industries have relied upon calibrated orifice differential pressure measurements as a standard method of indicating the volumetric fluid flow of their products in these pipelines. The principal reasons for the near universal usage of this orifice measurement technique are its simplicity and excellent repeatability under steady fluid flow conditions. Since an orifice differential pressure meter is an inferential one, errors can result when flow conditions deviate from the steady state flow conditions or from the conditions from which constants used to calibrate the meter were derived.

For example, the general equation for an orifice measurement is $Q=K(\Delta P)^{\frac{1}{2}}$ where K is a proportionality factor or constant, $\Delta P$ is the orifice differential pressure, and Q is the resulting volumetric flow rate. This equation illustrates the basic nonlinear nature of the orifice technique. It is because of this nonlinearity that the so-called square root error exists when the flow inside the pipe or closed medium is pulsating or varying substantially from a steady state or steady flow condition. Simply stated, the orifice average differential pressure is higher when fluid flow is pulsating than it would be with a smooth steady state flow, i.e., when the net total flow is the same over a time interval. This would be true even though the orifice constant factor K is not affected by pulsations. If the flow or Q is inferred from an average $\Delta P$, then the flow measurement would be incorrect in the presence of unsteady flow conditions or pulsations. Note, however, that if the continuous square root of the instantaneous $\Delta P$ was taken, and the resultant values averaged, then the square root error would vanish. The flow inferred then would be correct unless the pulsations somehow altered the calibration coefficient K for the orifice.

Most pressure indicators and recorders used by the industry in orifice meter applications do not have sufficient frequency response to track the flow pulsations normally produced by compressor stations, "hunting" regulators or vortex shedding conditions in the piping system. They tend to average $\Delta P$ although they may give some indications of pulsations on the recording chart (commonly referred to as "paint"). When these charts are read, there is a tendency to ignore the "paint" caused by pressure pulsations and more of a tendency to average the $\Delta P$ pressure. The result of any analysis process which averages $\Delta P$ before its square root is extracted will therefore produce what is termed "the square root error".

SUMMARY OF THE INVENTION

In accordance with the present invention an apparatus for determining a square root averaging error for a differential pressure orifice meter measuring volumetric fluid flow in a closed medium is provided that includes circuitry for providing a signal corresponding to an instantaneous differential pressure measured by the orifice meter and logic for receiving the signal from the circuitry and computing the square root averaging error for the orifice meter over a selected time interval.

In the preferred embodiment the logic includes the capability to compute the square root of each instantaneous differential pressure measurement and in addition the ability to compute a square root of an average of the instantaneous differential pressure measurements over the selected time interval. The logic means also computes the difference by subtracting an average of the square root of the instantaneous differential pressure measured by the orifice meter over the selected time interval from the square root of the average differential pressure and divides this difference by the average of the square root of instantaneous pressure measurements to compute the orifice meter square root error.

In a still further embodiment, the circuitry means includes an analog to digital converter connected to a pressure transducer that is connected to the orifice located in the closed medium. In this embodiment, display circuitry is also provided to display to the user the computed square root error. The apparatus further includes input circuitry connected to the logic means to allow the user to select the specific time interval and to control the computation of the square root error. In this embodiment, the minimum time interval is selected to be longer than the period of the lowest of any pulsation frequency, and the signal indicating the differential pressure at the orifice is provided at a frequency that is greater than twice the highest fluid flow pulsation frequency. Further, the logic controls the generation of the signal by the circuitry connected to the pressure transducer at the orifice. In this embodiment, the apparatus includes a self-contained power source to provide portability of the circuitry and logic.

Also disclosed is an apparatus for measuring volumetric fluid flow in a closed medium that includes circuitry for providing a signal corresponding to a differential pressure at an orifice located within the closed medium and logic for receiving this signal, computing a square root of the differential pressure in response thereto and providing an output signal corresponding to this square root value.

In its preferred embodiment, this apparatus includes a display connected to the logic to provide a visual output of the square root value. The logic includes an accumulator which accumulates the square root values over an interval of time. Input circuitry is provided to allow the user to specify the interval of time of accumulation of square root accumulation. The logic in this embodiment further includes a second output signal that corresponds to the average of the square roots over this interval of time. The display circuitry further includes the capability to display this average square root value. Digital to analog converter circuitry is provided to generate and display a signal corresponding to the square root value as an analog value.

BRIEF DESCRIPTION OF THE DRAWINGS

The novel feature which characterize the present invention are defined by the appended claims. The foregoing and other objects and advantages of the invention will hereinafter appear, and for purposes of illustration.

DETAILED DESCRIPTION OF THE PREFERRED EMBODIMENT

The present invention provides the square root error for averaged values of differential pressure measured at an orifice located in a closed medium such as a pipe providing means for volumetric fluid flow. This square root error results when the flow rate is inferred from the square root of average differential pressure values instead of from the average of the square root of the differential pressure values. The error is always positive and is independent of pulsation frequency and $\Delta P$ wave form.

$$SRE = \frac{\sqrt{avg \Delta P(t)} - avg \sqrt{\Delta P(t)}}{avg \sqrt{\Delta P(t)}}$$

Figure 1:
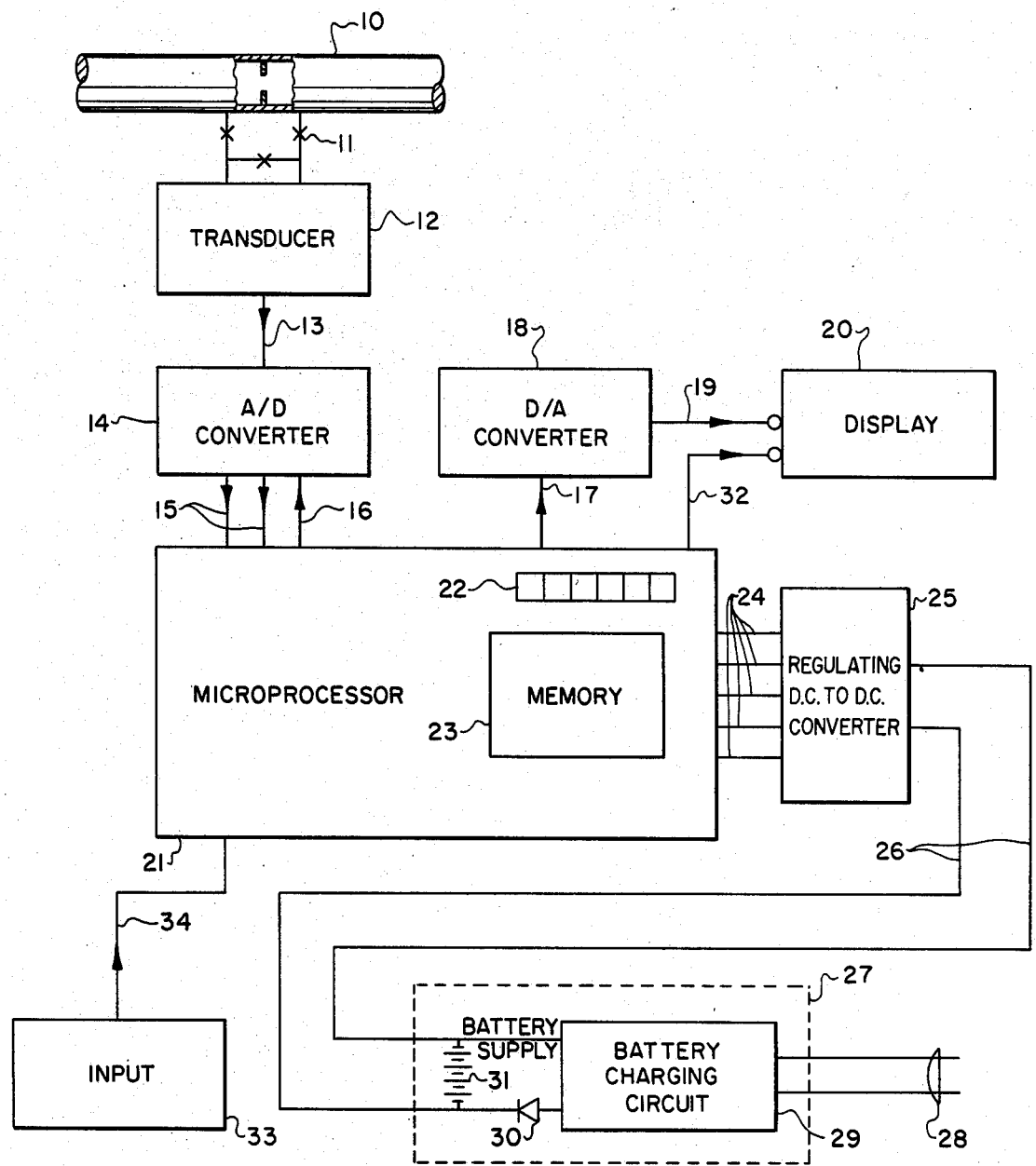
FIG. 1 is a block diagram of an electronic square root error indicator.

From this equation, it can be seen that the square root error can be inferred by the $\Delta P$ measurement, i.e., if $\Delta P(t)$ is measured and processed both ways. One of the objects of this invention is to provide this square root error. The invention, or square root error indicator, is illustrated in FIG. 1. A differential pressure orifice meter is connected to a pipe 10 that provides for the transfer of some fluid such as gas or oil or some other similar substance. A differential pressure transducer 12 is connected to the pipe 10 at two ports in pipe 10 as shown by the schematic representation 11. The differential pressure transducer 12 provides an analog signal corresponding to the differential measured across the orifice 11. This analog signal is then coupled to an analog to digital converter 14 which converts this differential pressure measurement into a digital signal which is transferred via lines 15 to microprocessor 21. Microprocessor 21 contains software in memory 23 that further commands the analog to digital converter 14 to provide these differential pressure digital signals via line 16. Therefore, the microprocessor 21 controls the sampling rate of the differential pressure measurements. The software of processor 21 contained within memory 23 computes the average of the differential pressure values over an interval of time. Similarly, this software computes the square root of this average pressure and computes the square root of each individual pressure measurement and accumulates this for the average of the square roots of the differential pressure measurements. The square root error is output via line 32 to a display 20 that, in the preferred embodiment, provides the digital representation of the square root error. The software contained within the microprocessor can also provide the square root of the instantaneous differential pressure measured by the transducer 12. In the preferred embodiment, this signal is output via line 17 to a digital to analog converter 18 which converts the digital output signal to an analog signal and transmits via line 19 the analog output signal to display 20 for an appropriate visual indication. In this embodiment, a voltmeter is used to display the square root value of the differential pressure instantaneous measurements.

In a still further software embodiment, the user may specify a time interval during which the square root values of the differential measurements are computed and stored within an accumulator 22 in the microprocessor 21. At the end of this time interval, the average of the square root differential pressure values are displayed via lines 32 to display 20. Both the analog indication of the instantaneous square root of the measured differential pressure and the average of the instantaneous square root of measured differential pressure provide a truer indication of the volumetric fluid flow than would a normal orifice meter reading since the square root error resulting from irregular fluid flow and pulsations has been eliminated.

In this embodiment input circuitry 33 is provided in the form of a keyboard to provide input control signals via line 34 allowing the user to control the time interval and the computation of variables by the microprocessor 21 software.

The square root error indicator also includes a power supply 27 that has a battery 31 connected to a battery charging circuit 29 and diode 30 with the capability to connect to a standard alternating current source via lines and plug 28. The battery 31 provides the user with a portable apparatus. The output of the power supply 27 is connected to a regulating direct current to direct current converter 25 via lines 26. The function of the regulating DC to DC converter 25 is to provide the specific direct current power voltage requirements of the microprocessor 21 via lines 24.

The software contained within memory 23 provides the square root error calculation by sampling the pressure transducer 12 through the analog digital converter 14 at a user specified sample frequency. The following formula is used for computing the square root percentage error.

$$\% \text{ Error} = \left[\sqrt{\frac{1}{N}\sum_{i=1}^{N}\Delta P_i} - \frac{1}{N}\sum_{i=1}^{N}\sqrt{\Delta P_i}\right] \cdot 100 / \frac{1}{N}\sum_{i=1}^{N}\sqrt{\Delta P_i}$$

The above formula provides a reasonably accurate estimation of the percentage square root error provided the following conditions prevail:

(1) the rate at which the samples of $\Delta P$ are obtained is greater than twice the highest frequency component of $\Delta P$.

(2) the total time of observation is long compared to the period of the lowest frequency component of $\Delta P$.

In the preferred embodiment the square root error indicator is designed to acquire the $\Delta P$ data in accordance with the above conditions.

For the purpose of illustration considering the following hypothetical example. A conventional orifice meter is connected to a chart recorder to provide instantaneous orifice flange tap differential pressure measurements on command. In this example, the flow rate is ranging from zero to some nominal positive value and the differential pressure transducer connected in the orifice meter is commanded to output ten consecutive values of orifice differential pressure at one tenth of a second intervals. The resulting values are 1.0. 1.5, 0.25, 0.00, 0.40, 0.20, 0.62, 0.16, 0.67, 0.20 inches of mercury, respectively. Over this same time interval the chart recorder would indicate an average orifice differential pressure measurement of 0.5 inches of mercury which is the simple average of the ten instantaneous values. The best possible estimate of actual flow rate over this time interval would be obtained from the ten instantaneous values by taking the square root of each value adding them together times the constant K and dividing them by the number of values (i.e., ten) to arrive at 0.626K, representing the volumetric fluid flow rate. If only the chart recorder data was available, the estimated flow would be K times square root of 0.5 or 0.707K. These two numbers differ by 12.94 percent. This example graphically illustrates the nature of a real source of fluid flow rate measurement error called "square root averaging error" where a square root law device such as an orifice is used to measure time varying flow with an averaging differential pressure indicator or transducer.

The software in the present invention is designed to compute accurately the magnitude of the square root error. The square root error indicator determines square root error from the pressure signals actually appearing on the diaphragm of the differential pressure transducer 12. In this invention, $\Delta P(t)$ is sensed by a wide band differential pressure transducer. The electrical analog signal that is proportional to this differential is periodically sampled and converted to a digital numeric value equal to the instantaneous value of $\Delta P$ at a rate of 256 samples per second. As these values of $\Delta P$ are obtained, they and their square root values are entered in a pair of running accumulators illustrated as accumulators 22 in FIG. 1. When the sampling period ends, the contents of these accumulators are divided by the total number of samples taken and the results returned to their respective accumulators. Thus, one accumulator contains the average $\Delta P$ (i.e., $\overline{\Delta P(t)}$) and the other contains the average of the instantaneous square roots of $$P(t) \text{ or } \overline{\sqrt{\Delta P(t)}} = \frac{1}{T} \int_0^T \sqrt{\Delta P(t)}\, (dt).$$

The square root of average $\Delta P$ is then taken yielding $\sqrt{\overline{\Delta P(t)}}$. The average of square roots of $\Delta P(t)$ is then subtracted from the square root of the average $\Delta P(t)$ and this result divided by the average of the square roots of $\Delta P(t)$ to yield the square root error. In the preferred embodiment, this result is then multiplied by 100 and the result is displayed on a digital display as a signed 5 digit decimal number.

Figure 2:
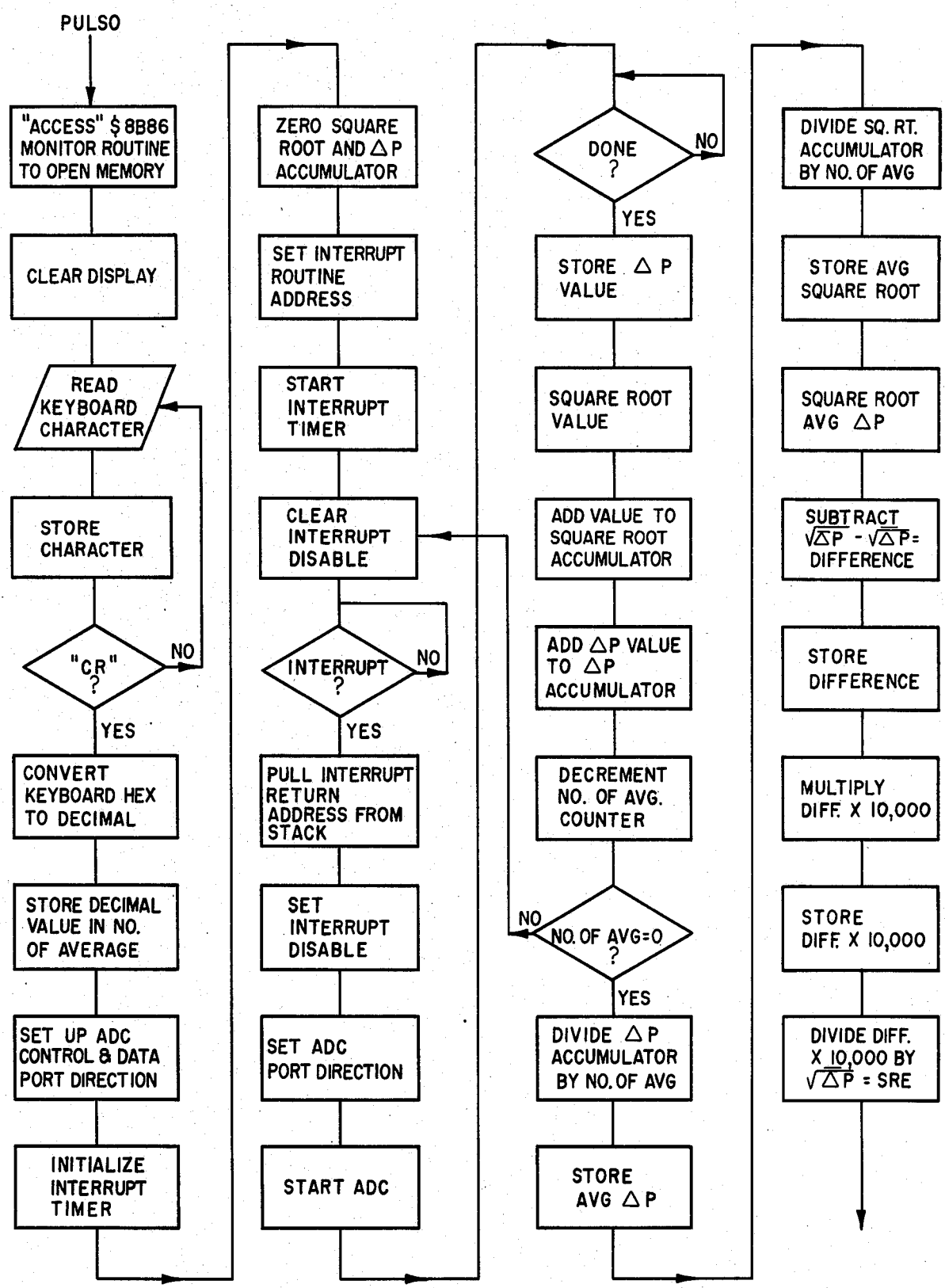
FIG. 2 is a flow chart of the software that computes the square root error.

FIG. 2 is a flow chart of the software that computes the square root error. This software includes both data acquisition and the computation of the square root error. After memory is accessed and the display cleared, the timing interval is input from the keyboard. The analog to digital converter is then initialized along with the interrupt timer. After initializing the accumulators, the interrupt timer is started. Upon an interrupt, the analog to digital converter input is stored in one of the accumulators. The square root of this value is computed and stored in a second accumulator. The sequence is repeated until the number of increments specified by the user, i.e., the time interval, is complete and then the accumulators are both divided by the number of values stored to compute the average values for both accumulators. The average of the square root of the differential pressure is then subtracted from the square root of the average differential pressure and divided by the average of the square root of the differential pressure to compute the square root error.

Figure 3:
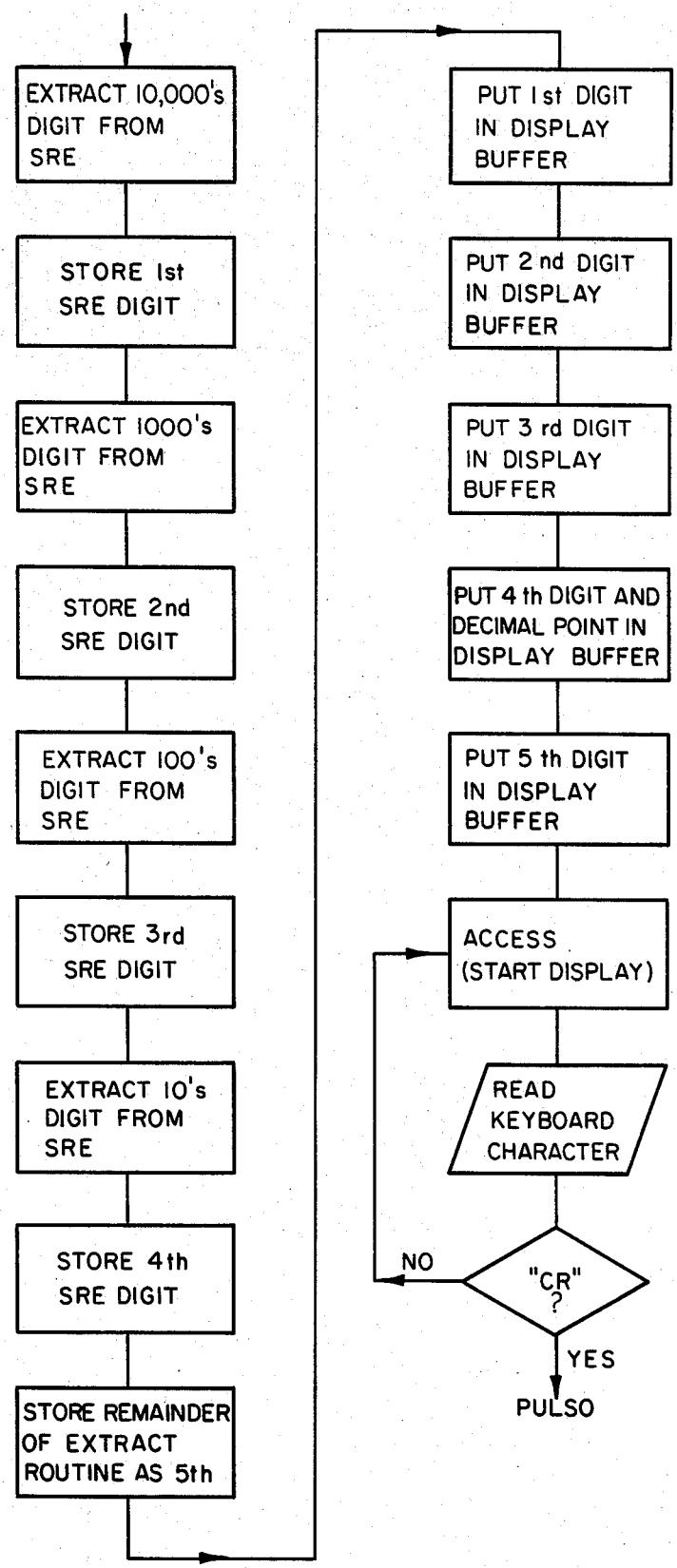
FIG. 3 is a flow chart of the display software.

FIG. 3 illustrates the flow chart of software that is used to display the 5 digit representation of this square root error on the display.

The square root error indicator may also be used to indicate the instantaneous flow rate. As previously discussed, if square root values of the instantaneous $\Delta P(t)$ are obtained, the square root error vanishes and the square root values are proportional to the instantaneous flow rate. The average of such values is also proportional to the average flow rate.

Figure 4:
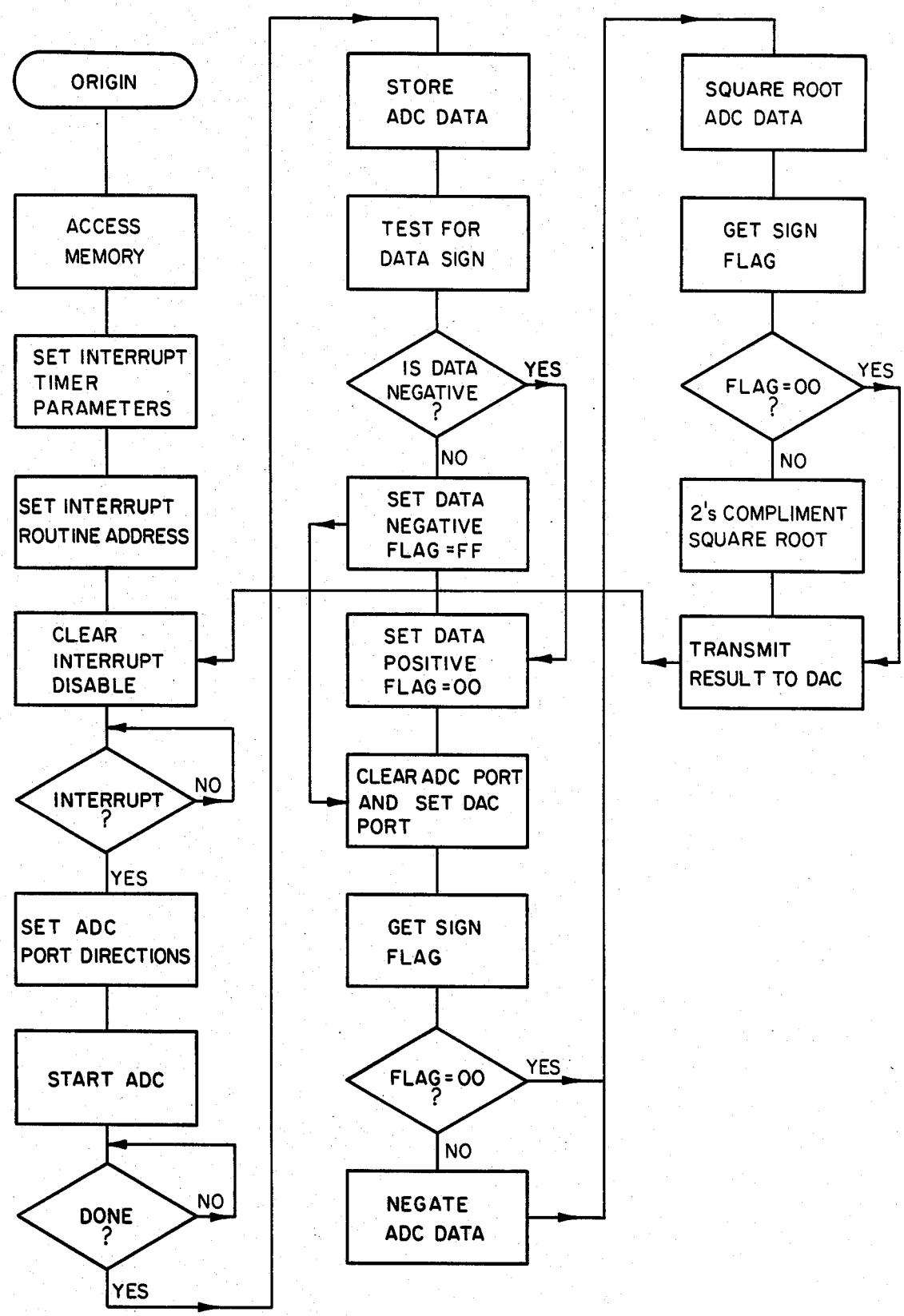
FIG. 4 is a flow chart of the software that provides the indication of volumetric flow using the instantaneous square root of differential pressure measurements.

The square root error indicator may also function as a real time linear flow rate indicator. In this mode, a separate and independent program is accessed which is illustrated in flow chart form in FIG. 4. When accessed this program sets up an interrupt timer which runs at the fixed rate of 256 Hertz. Each interrupt initiates the following sequence of events:

(1) The analog to digital converter is commanded to digitize the differential pressure transducer signal.

(2) The result of analog to digital converter data is tested for sense or polarity of the differential pressure $\Delta P$ and a sign flag is set denoting direction of flow.

(3) The square root of the absolute value of $\Delta P$ is calculated.

(4) This result is converted to a twos complement binary number as determined by the magnitude of the square root and the value of the sign or flow direction flag previously set.

(5) This binary result is provided to a digital to analog converter which outputs an electrical analog signal scaled from 0 to 10 volts. This analog output signal is used to indicate the flow rate.

(6) The above sequence is repeated upon the next interrupt cycle.

It should be obvious to one skilled in the art that the square root of the instantaneous differential pressure measurements may be accumulated, averaged and displayed on a digital display for an interval of time specified by the user. This type of mechanism provides the user with an accurate indication of the amount of flow during the user specified time interval.

Figure 5:
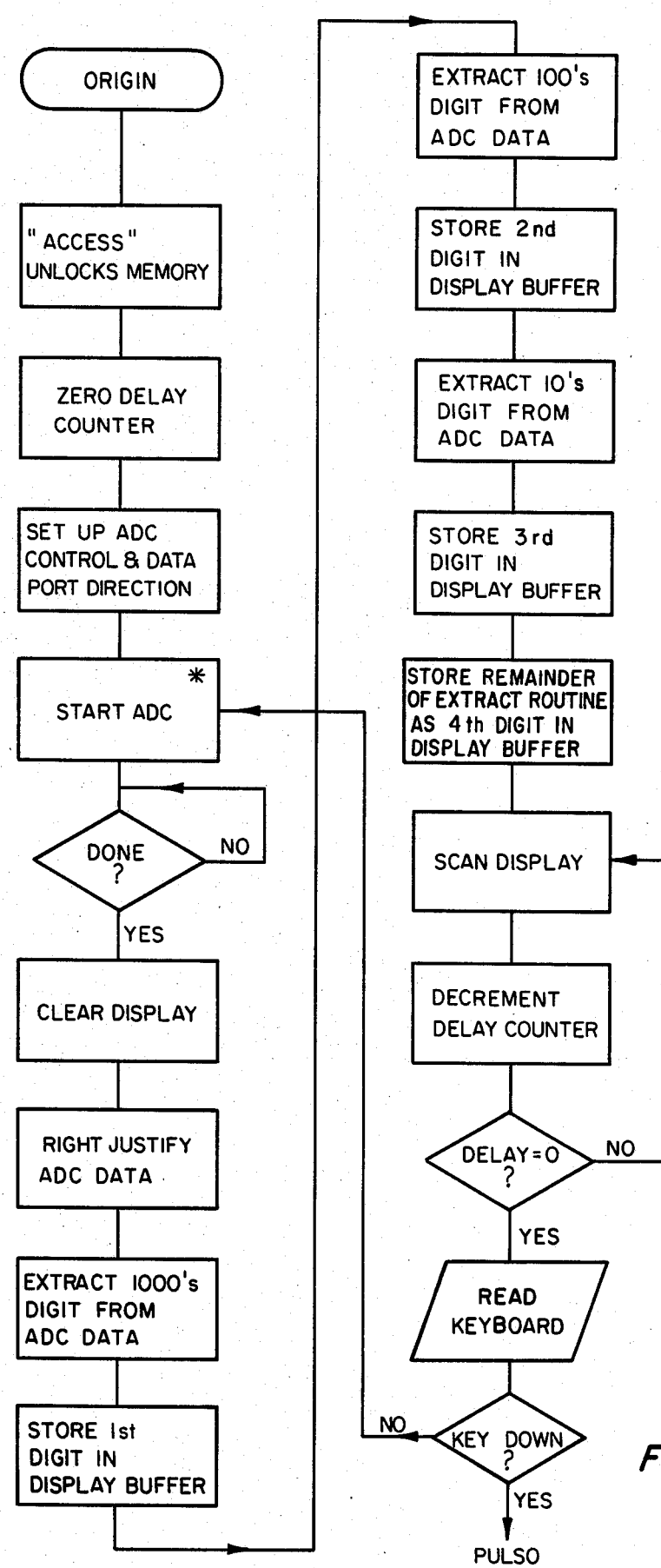
FIG. 5 is a flow chart of the calibration software.

A further mode of operation is provided for the purpose of calibrating the pressure transducer and checking the basic operations of the square root error indicator. FIG. 5 illustrates the flow chart for the software which when accessed, continually executes the following steps:

(1) The analog to digital converter is commanded to digitize its analog input signal derived from the pressure transducer;

(2) The resultant 12 bit binary number is converted to an equivalent 4 digit decimal number in range from 0 to 4095;

(3) These 4 digits are displayed by the L.E.D. display representing an unscaled value of the analog input signal (i.e., the differential pressure sensed by the transducer); and (4) The preceding steps repeat until interrupted by the user accessing the keyboard keys.

In the preferred embodiment, this sequence when interrupted, branches to the square root error routine and waits for keyboard entry from the user specifying the time interval. When this number is input followed by a "CR" character, the square root error routine completes execution leaving the results displayed and the processor waiting for another averaging time entry (interval time) input.

In this preferred embodiment, the square root error indicator includes a Synertek 6502 microprocessor with 1024 bytes of random access memory and 2048 bytes of program read only memory. The program contained in the read only memory and illustrated in FIGS. 2 through 5 is listed in Appendix A in Assembly Nuemonic Language and Machine Code. The microprocessor is interfaced to a small keyboard, a 6 digit L.E.D. display, and an analog-digital converter with a sample and hold device and a digital-to-analog converter. A Validyne model P305D differential pressure transducer is provided as the means for obtaining $\Delta P(t)$. This system is powered by a regulated power supply operating from an 18 VDC lead-acid battery pack. In this embodiment the pressure transducer is a small device packaged with signal conditioning electronics and is connected to the square root error indicator via a 50 foot cable.

Although the preferred embodiments have been described in detail, it should be understood that various substitutions, alterations, and modifications may become apparent to those skilled in the art. These changes may be made without departing from the spirit and scope of the invention as defined by the appended claims.

What is claimed:

1. An improved square root error indicator apparatus comprising:
   (a) a differential pressure transducer means for producing analog signals representative of differential pressures of fluid flowing through a closed medium orifice;
   (b) an analog to digital converter means operatively connected to the differential pressure transducer means for converting the analog signals to digital signals; and
   (c) a digital computing means responsive to the digital signals for producing square root error signals, said digital computing means including a data processing means and an instruction means, said processing means responsive to instructions of the instruction means for: producing signals representative of the square roots of the differential pressure signals; accumulating the differential pressure values and the square root values of the digitized signals for a preselected time; averaging the accumulated differential pressure values and the corresponding square root values thereof; determining the square root value of the average differential pressure; determining the difference between the square root of the average differential pressure and the average of square roots of the differential pressures; and dividing the difference by the average of the square roots of the differential pressures whereby the square root error is produced.

2. An apparatus according to claim 1 wherein said apparatus further includes display means connected to said digital computing means for displaying the square root error.

3. An apparatus according to claim 2 wherein said apparatus further includes a time interval and sample rate input means connected to said digital computing means for providing external control of the computation of the square root error.

4. An apparatus according to claim 3 wherein said time interval and sample rate input means is for inputting a time interval longer than any pulsation frequency time interval of fluid flow.

5. An apparatus according to claim 3 wherein said time interval and sample rate input means is for inputting sample rate signals at a frequency greater than twice any fluid flow pulsation frequency.

6. An apparatus according to claim 1 wherein said apparatus further includes a self-contained power means for supplying electrical power to said apparatus.

7. An apparatus according to claim 1 wherein said differential pressure transducer means is a wide band differential pressure transducer.

8. An apparatus according to claim 1 wherein said data processing means is further responsive to instructions of the instruction means for multiplying the square root error signals by 100 whereby the square root percentage error is determined.

9. An apparatus according to claim 1 wherein said digital computing means further includes first and second accumulators for accumulating, respectively, the differential pressure and the square roots thereof over a preselected interval of time.

* * * * *